United States Patent [19]

Humble

[11] Patent Number: 4,964,053
[45] Date of Patent: Oct. 16, 1990

[54] SELF-CHECKOUT OF PRODUCE ITEMS

[75] Inventor: David R. Humble, Deerfield Beach, Fla.

[73] Assignee: CheckRobot, Inc., Deerfield Beach, Fla.

[21] Appl. No.: 420,685

[22] Filed: Oct. 11, 1989

Related U.S. Application Data

[63] Continuation of Ser. No. 185,167, Apr. 22, 1988, abandoned.

[51] Int. Cl.$^5$ .................... G06F 15/22; G07C 11/00
[52] U.S. Cl. .................................... 364/466; 186/61; 235/383; 340/572; 364/478
[58] Field of Search .............. 364/466, 464.01; 177/4, 177/5, 25.15; 235/383; 186/61

[56] References Cited

U.S. PATENT DOCUMENTS

| | | | |
|---|---|---|---|
| 4,093,032 | 6/1978 | Uyama et al. | 364/466 |
| 4,229,794 | 10/1980 | Foster | 364/466 |
| 4,266,623 | 5/1981 | Kawamishi et al. | 364/n466 |
| 4,301,878 | 11/1981 | Soe | 364/466 |
| 4,398,253 | 8/1983 | Karp et al. | 177/25.15 |
| 4,597,457 | 6/1986 | Ikekita | 364/466 |
| 4,601,355 | 6/1986 | Takahashi | 364/466 |
| 4,712,929 | 12/1987 | Kitaoka | 364/466 |

Primary Examiner—Felix D. Gruber
Attorney, Agent, or Firm—Robin, Blecker, Daley & Driscoll

[57] ABSTRACT

An operator-unattended checkout system for processing articles selected for purchase and of first type bearing supplier-applied UPC indication and of second type not having supplier-applied UPC indication includes a reader for generating output signals indicative of article UPC indication where present on articles, a first processing part operable without customer input for using the reader output signals for determining first type article price and generating output signals indicative thereof, a customer-interactive display unit for use through customer input thereto for directing system operation selectively from such first processing part operation to the computation of second type article price, a scale for determining article weight and generating output signals indicative of determined article weight, and a second processing part operable on customer input to the display unit for using the scale output signals for generating ouput signals indicative of second type article price.

9 Claims, 3 Drawing Sheets

SELF-CHECKOUT OF PRODUCE ITEMS

This is a continuation of Ser. No. 185,167, filed April 22, 1988, now abandoned.

BACKGROUND OF THE INVENTION

1. Field of the Invention

The invention relates generally to the field of self-service distribution systems, and in particular, to the field of customer self-checkout of articles not provided with machine-scannable price code labels.

2. Prior Art

A self-service distribution system is described in U.S. Pat. No. 4,676,343. Check-out counters for use in a supermarket, for example, are provided with a laser scanner for reading the Universal Product Code (UPC) labels on the individual products presented to it by each customer. The counters are also provided with transport belts or conveyors controlled by a central processor which, in turn, is supplied with the information from a weigh scale under the input conveyor and from optical curtain devices at strategic locations along the belts and in a bagging area. The outfeed conveyor operates through a tunnel such that a customer cannot reach a product being conveyed therethrough. An optical curtain disposed at the entry to the tunnel is broken by passage of an article into the tunnel and also by a customer reaching into the tunnel. Products are conveyed to the bagging area if (1) the actual weight of the product as determined by the scale corresponds to the anticipated weight obtained from a memory bank based upon the product UPC label identification, and (2) none of various other events have occurred. A display screen prompts the customer with questions and instructions. Improper use of the system causes interruption or reversal of conveyor operation and requires that a product be removed and rescanned. When scanning is complete, the customer activates an input signal and is furnished with a printed itemized list which is taken along with subsequently bagged products to a cashier for payment and issuance of a final receipt. An article surveillance system may be included to detect any tagged products transported along the pedestrian path rather than along the path through the tunnel.

Although such a system provides great efficiency of operation for most kinds of articles, the system cannot cope with articles not already having scannable UPC labels. In a typical supermarket not equipped with a self-checkout system, produce checkout is handled in the most inefficient manner. The customer just take the articles to the checkcut counter, the articles must be weighed by the cashier and the price must be manually entered by the cashier at the keyboard of the payment register. Unlike meat, delicatessen and bakery departments in a supermarket, the produce department is generally not staffed.

Accordingly, use of a self-checkout system requires that the produce department be staffed and that all articles be provided with UPC labels. Alternatively, some means must be provided for customers to carry produce through to the cashier, bypassing the self-checkout counters. This is expensive in requiring that the produce department be staffed, or is inefficient in requiring that cashiers do more than merely attend collection of receipts.

This invention overcomes these significant problems in dealing with the self-checkout of such inconvenient articles as produce, by obviating the need to staff the produce department and by obviating the need for the cashier to weigh and calculate produce prices.

SUMMARY OF THE INVENTION

It is an object of this invention to provide an apparatus for effecting customer self-checkout articles not provided with machine-scannable price code labels.

It is another object of this invention to provide a method for effecting customer self-checkout of articles not provided with machine-scannable price code labels.

It is yet another object of this invention to provide methods and apparatus for effecting customer self-checkout of such articles, without a need for application of price code labels by store personnel or by customers.

It is yet another object of this invention to provide methods and apparatus for effecting customer self-checkout of such articles, without need for a cashier to determine a price for such articles.

These and other objects of the invention are accomplished by an apparatus for effecting customer self-checkout of articles not provided with machine scannable price code labels, the apparatus comprising: means for storing price data for articles not provided with a machine scannable price code label; means for storing icons corresponding to the article; means for calculating a price for each self-checked article; means for displaying the icons and the calculated prices; means for conveying the articles through a weigh station; and, customer actuable means for selectively displaying an icon corresponding to a conveyed article, the price for each article being automatically calculated in accordance with the selected icon, the stored price data and the weight of the article, whereby an article may be self-checked by customer placement of the article on the conveyor, customer selection of the corresponding icon and subsequent movement of the article through the weigh station.

In a presently preferred embodiment, the displaying means comprises a video terminal disposed adjacent to the conveying means, the video terminal having a touch actuable screen for customer selection among the icons. The apparatus also preferably comprises means for printing a list of the calculated prices, as well as means for calculating a running tally of calculated prices. The apparatus may be used in combination with a system for effecting self-checkout of articles which are provided with machine scannable price code labels.

These and other objects of the invention are also accomplished by a method for effecting customer self-checkout of articles not provided with machine-scannable price code labels, comprising the steps of: storing price data for article not provided with a machine-scannable price code label; storing icons corresponding to the article; receiving each article at a customer accessible station; providing, for each received article, an opportunity for customer selection of a displayed icon corresponding to the received article; automatically weighing each received article for which a corresponding icon has been selected; automatically calculating the price for each article in accordance with the selected icon, the stored price data and the weight of the article; and, displaying the calculated price for each article, whereby an article may be self-checked by customer placement of the article on the conveyor, customer selection of the corresponding icon and subsequent movement of the article through the weigh station.

The method may further comprise the steps of storing and printing the calculated price for each article, as well as maintaining a running tally of the calculated prices.

The method may also comprise the step of comparing the weight of each article to a predetermined range of values for detecting customer selection of incorrect icons, by storing weight range data corresponding to each of the articles and comparing same to actual weights.

BRIEF DESCRIPTION OF THE DRAWING

The invention is described in connection with the presently preferred embodiment shown in the drawings, it being understood, however, that the invention is not limited to the precise arrangements and instrumentalities shown.

DETAILED DESCRIPTION OF THE PREFERRED EMBODIMENTS

Figure 1:
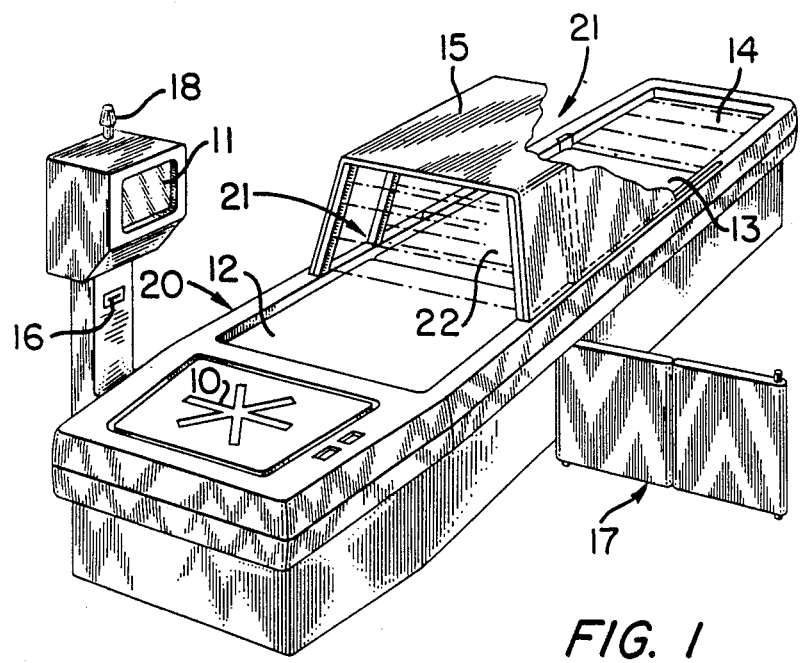
FIG. 1 is a perspective view of a self-checkout counter according to the prior art.

The self-checkout system according to this invention, for articles not provided with machine scannable price code labels, is preferably incorporated into a self-checkout system for articles which are provided with machine-scannable price code labels. Such a system is described in U.S. Pat. No. 4,676,343, and the teachings thereof are fully incorporated herein by reference. The parts of such a prior art system most pertinent to this invention are shown in FIG. 1. A check-out counter 20 comprises a laser universal product code (UPC) reader 10, a display screen 11 for interactive customer communication, an entry conveyor 12, an outfeed conveyor 13, a bagging area 14, a tunnel 15, passageway control gate 17 and an assistance signal lamp 18.

A single cashier and cashier register may be provided for groups of check-out counters, each group having two or more counters therein. Each cashier register station is provided with a master monitor screen, a keyboard with cash drawer, a final sales slip printer and a customer viewable display. The details of the cashier station are available directly from the incorporated patent.

Most products in a supermarket are provided with identification in the form of the universal product code, which identifies the product.

In using such a check-out counter, a customer approaches the counter with items to be purchased, usually transported in a conventional shopping cart. If the counter is available for use, the display screen 11 will carry certain messages instructing the customer in use of the system. The display screen 11 is preferably touch sensitive or touch activated by touching with a human digit at any one of a number of predetermined locations. Applying a finger to one of the locations is equivalent to operating a switch or pressing a signal button, and communicates to a central processor whatever affirmative response has been made in answer to the query displayed on the screen. Appropriate responses will result in activation of the laser scanner 10.

Once the laser scanner has been activated, the customer may pass each item or article, one by one, UPC code down, over the laser and deposit same on the entry conveyor 12. Absent any problems, the prices and item identifications will appear on the display 11 as the items are transported by the conveyors through the tunnel 15, out of reach of the customer to the bagging area 14. When all items or articles have been scanned over laser 10 and placed on entry conveyor 12, the customer will touch the touch sensitive input location corresponding to completion of the check-out tasks. This initiates the presentation to the customer of a printed receipt from the receipt unit 16 and preferably displays a message on screen 11 directing the customer to pass through the control or security gate 17 to the bagging area 14. After the customer has bagged the items and placed the loaded bags in the shopping cart, the customer then proceeds to the cashier station. Each counter 20 will have a separate coded identifier by which it can be identified to the cashier. This coded identification will appear on the printed receipt proffered to the cashier, and will also appear on the master monitor screen along with a subtotal corresponding to that totaled by the receipt unit and temporarily stored in the central processor.

The cashier can use the keyboard to enter credit for proffered coupons and can add any items that could not be handled automatically by the counter 20. These might be oversize items which cannot pass through the conveyor, and would almost certainly be all produce items, which are not ordinarily provided with machine-scannable UPC price labels. As the cashier makes entries through the keyboard, a visual confirmation is provided to the customer by the corresponding display. A final receipt is printed and furnished by another printer, and the payment transaction is accomplished in the conventional manner.

In order for a self-service system to be effective it must include various safeguards to accommodate inadvertent customer mistakes, to separate customers and to prevent comingling of the articles of one customer with those of another. The system must also insure against attempts to either bypass the system or defraud. For this purpose there are provided a series of electronic curtains or photoelectric devices 21, a weigh scale 22 and, optionally, an article surveillance system 29.

Upon satisfactory scan of an article, the description thereof and its price may be displayed on screen 11. At the same time, the central processor 23 receives information from a data store concerning the normal weight of the article=just scanned. This weight is compared with that determined by the weigh scale 22. If there is proper correlation, the conveyors 12 and 13 will convey the article to the bagging area 14. If there is a discrepancy, the system will return the article=to the customer for repetition of the scanning operation.

Such a system functions very efficiently, and is meeting with commercial acceptance. Even so, the system, cannot cope with articles such as produce items, as such items are not provided with UPC price labels and as the produce departments of most supermarkets are not staffed and no means is available for preparing and affixing such labels, as is the case in other departments of the supermarket.

Figure 2:
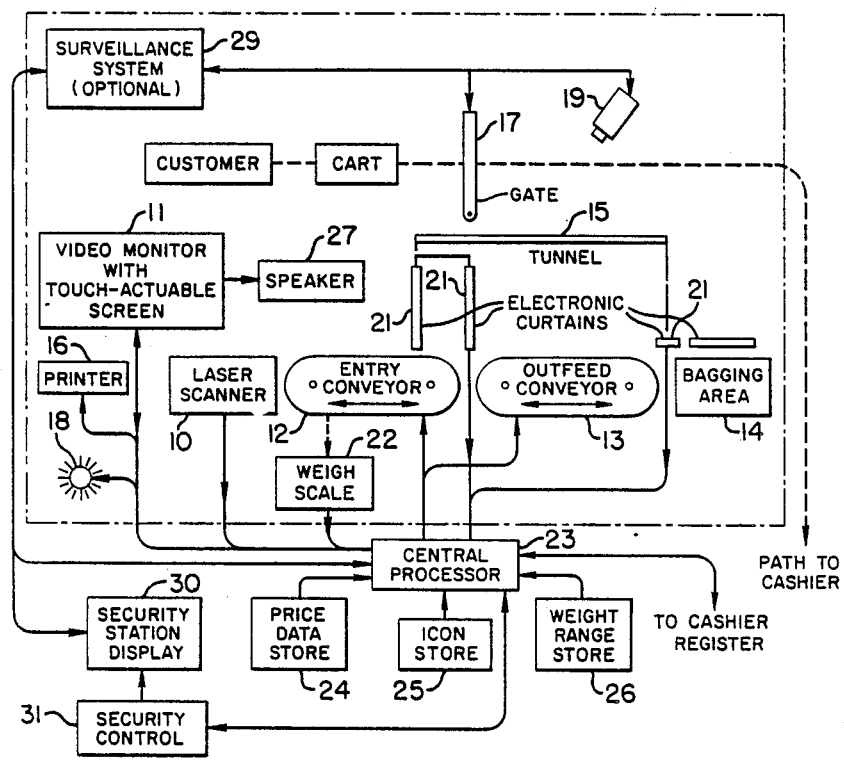
FIG. 2 is a block diagram illustrating the invention as incorporated into a prior art self-checkout system as exemplified by that shown in FIG. 1; and, FIGS. 3-7 illustrate a typical sequence of video displays provided for customer selection of icons corresponding to produce items being checked-out.

The inability to deal with such unmarked articles as produce items is accomplished by the invention taught herein, which provides methods and apparatus for effecting customer self-checkout of articles not provided with machine scannable UPC price code labels. The invention may be appreciated from the block diagram thereof shown in FIG. 2. It will be appreciated by those skilled in the art that the invention, as illustrated, has been incorporated into a self-checkout system otherwise adapted for handling only such items as are provided with UPC price labels.

A central processor 23 may form part of a local, network or remote computer. The central processor 23 includes means for storing price data for all articles not provided with a machine-scannable code, in the form of price data store 24. The central processor 23 also comprises means for storing icons, that is, a pictorial image or symbol, corresponding to each of the articles not provided with a machine-scannable code, in the form of an icon store 25.

The video monitor 11 provides a means for displaying the icons, as well as additional information. The touch-actuable=screen of the video monitor 11 forms a customer actuable means for selectively displaying an icon corresponding to an article placed on the entry conveyor 12.

Figure 3:
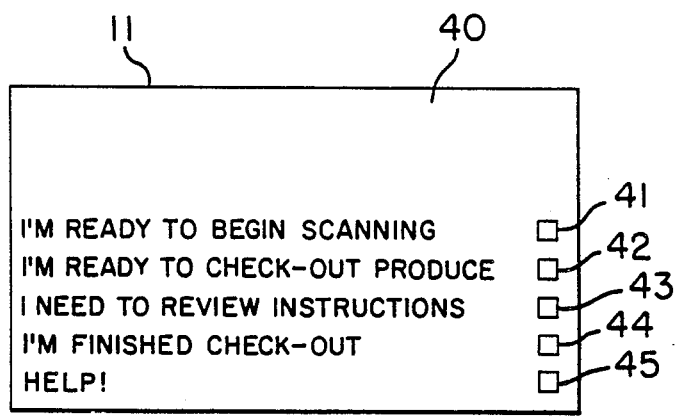

In use, a customer would approach a self-checkout counter, having selected for purchase both articles with and without UPC labels. FIG. 3 illustrates a typical initial message display 40 on video monitor 11. The screen offers a customer the choice of scanning articles with UPC labels, checking out produce (that is, articles without UPC labels), requesting additional instructions, concluding the check-out and requesting HELP. The touch actuable screen comprises a set of "buttons", in the form of predetermined blocks or areas which send signals to the central processor responsive to touching the specific area. The video monitor message displays in FIGS. 3–7 utilize five such blocks or areas, merely for purposes of illustration. The "buttons" or blocks are identified by reference numerals 41, 42, 43, 44 and 45.

Figure 4:
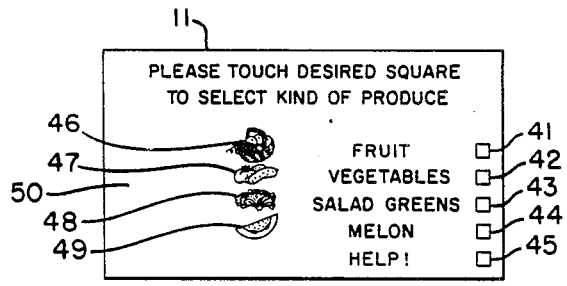
Figure 5:
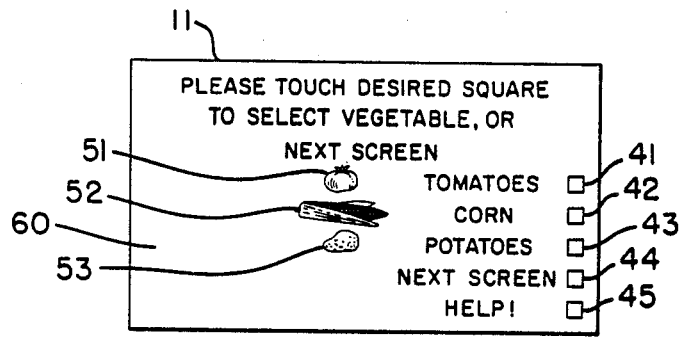
Figure 6:
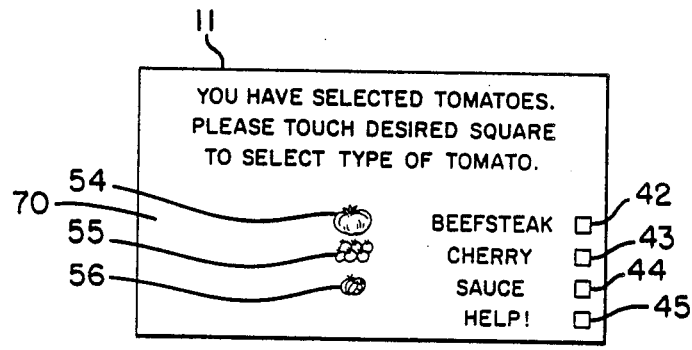

In order to self-checkout all produce items, a customer confronted by message display 40 will press or touch block 42. This will deactivate certain security functions associated with weigh scale 22, and will place the system in a mode appropriate for successively weighing each of the conveyed articles. Actuation of button 42 from message display 40 will result in message display 50 as shown in FIG. 4. Message display 50 instructs the customer to select among broad categories of produce, for example fruit, vegetables, salad greens and melon. Touch buttons or blocks 41, 42, 43 and 44 are associated with each of these selections respectively. An icon is also associated with each of the categories. Icon 46 maybe a bowl of fruit, icon 47 may be a tomato, cucumber or the like, icon 48 may be a head of lettuce and icon 49 may be a slice of watermelon. The appropriate category of produce may be selected by touching any one of buttons 41 through 44, or in a presently preferred embodiment, touching one of icons 46, 47, 48 or 49. If a customer chooses button 42 or icon 47, the customer may be presented with message display 60 as shown in FIG. 5. For purposes of simplifying the illustration, message display 60 provides a selections between three kinds of vegetables, namely tomatoes, corn and potatoes. The three selections have buttons 41, 42 and 43 associated therewith, as well as corresponding icons 51, 52 and 53. If a customer selects tomatoes by touching button 41 or icon 51, the customer may be presented with message display 70, as shown in FIG. 6. Message display 70 offers the customer a final selection between three kinds of tomatoes, namely beefsteak, cherry and sauce tomatoes. The three types of tomatoes have associated therewith buttons 42, 43 and 44, as well as icons 54, 55 and 56 each respectively.

Figure 7:
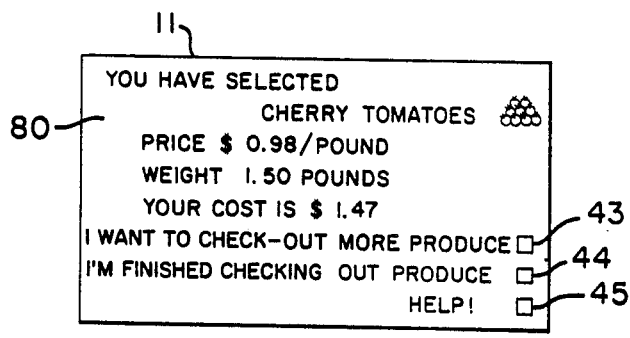

If a customer then touches button 43 or icon 55, a message display 80 as shown in FIG. 7 will indicate that cherry tomatoes have been selected and that the price of cherry tomatoes is $0.98 per pound. Upon customer selection of the proper icon, the article is automatically conveyed to the weigh scale and the weight of the article(s) is transmitted back to the central processor 23. The central processor 23 can automatically calculate the price for each article=in accordance with the selected icon, the stored price data and the weight of the article. Message display 80 can then indicate that the cherry tomatoes weigh 1.5 pounds and that the cost is 1.47. The screen may then provide the customer with an opportunity to check out more produce, to conclude produce check-out or to get HELP.

It will be appreciated by those skilled in the art that many hierarchies of groups and classes of produces can be provided to facilitate prompt customer selection of the appropriate+=produce icon. The selections might be ordered upon category, alphabet listing or even color. Those skilled in the art will also appreciate that touch-actuable video screens can be provided with large numbers of "buttons", over the entire surface of the screen.

Certain security measures may also be appropriate for this mode of operation. A first security measure requires that the weight of each article be compared to a predetermined range of values for detecting customer selection of incorrect icons. A weight range store 26 can provide typical upper and lower limits of average produce weights for average purchases. For example, a weight of 20 pounds would likely be inappropriate when the icon for celery has been selected, and a weight of only several ounces is likely inappropriate when the icon for watermelon has been selected. Such anomalies would result in reverse operation of the entry conveyor and a displayed instruction to reselect the proper icon.

An optional surveillance system 29 can also be provided which would include article surveillance security gates 17 as described in the incorporated reference patent, as well as a remotely controllable video camera 19, which can be monitored at any of the cashier stations or at a central security control station 31, having a security station display 30. When the item has been stopped in security zone, the actual item description will appear in large letters on the video monitor 11 and the actual picture of the item, together with the price and description thereof, will appear on the monitor at the cashier station or security. The cashier or security personnel can then activate controls to allow the items to proceed, or to reject the item. The video monitor may also be provided with a speaker 27, which will announce the item chosen as the calculation is being made. To the extent that certain items are more susceptible to customer fraud or mistake than others, selection of a "flagged" article can result in a security review each time such an article is checked-out.

This invention may be embodied in other specific forms without departing from the spirit or essential attributes thereof. Accordingly, reference should be made to the appended claims, rather than to the foregoing specification, as indicating the scope of the invention.

What is claimed is:

1. An operator-unattended checkout system for processing articles selected for purchase and of first type bearing UPC indication and of second type not having UPC indication, said system comprising:

(a) reader means for generating output signals indicative of article UPC indication where present on articles;
(b) conveyor means for receiving articles and conveying them;
(c) scale means arranged operatively with said conveyor means for determining article weight and generating output signals indicative of determined article weight;
(d) customer-interactive display means for use in the computation of second type article price;
(e) processing means
  (1) operable without customer input for using said scale means output signals and said reader means output signals for comparing the weight of the article read by said reader means with the weight indication provided by said scale means output signals and for generating first processing means output signals indicative of failure of such determination and second processing means output signals indicative of first type article price, and
  (2) operable on customer input to said display means for using said customer input and said scale means output signals for generating third processor means output signals indicative of second type article price;
(f) control means responsive to said first processing means output signals for reversing the direction of movement of said conveyor means; and
(g) totalizing means for receiving said processor means second and third output signals for providing a totalized price for said articles selected for purchase.

2. The invention claimed in claim 1 wherein said display means presents a first display message for customer initiated checkout of said articles of said second type.

3. The invention claimed in claim 2 wherein said processor means is responsive to customer interaction with said display means during display of said first message for displaying a second display message comprising icons indicative of said articles of said second type, said display means being responsive to customer interaction with said second display message for generating output signals indicative of customer selected icons.

4. The invention claimed in claim 3 wherein said processor means includes storage means storing therein first signals indicative of said icons and second signals correlated with said first signals and indicative of prices of articles of said second type.

5. The invention claimed in claim 4 wherein said processor means includes comparator means for receiving said display means output signals and comparing them with said stored first signals and generating as said processor means output signals, the stored second signal correlated with stored first signals giving rise to affirmative comparison.

6. The invention claimed in claim 1 wherein said display means comprises a video terminal having a touch-actuable screen for customer interaction.

7. The invention claimed in claim 6 wherein said screen presents a first display message for customer initiated checkout of said articles of said second type and wherein said second processor means is responsive to customer interaction with said screen during display of said first message for displaying a second display message comprising icons indicative of said articles of said second type, said screen including a plurality of blocks thereon for customer interaction, a common one of said blocks being used both for said initiation of customer checkout of second type articles and for customer interaction for generating output signals indicative of customer selected icons.

8. In combination, in an operator-unattended checkout system for processing articles selected for purchase and of first type bearing supplier-applied UPC indication and of second type not having UPC indication:

(a) reader means for generating output signals indicative of article UPC indication where present on articles;
(b) conveyor means for receiving articles and conveying them;
(c) scale means arranged operatively with said conveyor means for determining article weight and generating output signals indicative of determined article weight;
(d) display means for customer input; and
(e) processing means
  (1) operable without customer input to said display means for using said reader means output signals for determining first type article price and generating output signals indicative thereof; and
  (2) operable on customer input to said display means for using said customer input and said scale means output signals for generating output signals indicative of second type article price.

9. In combination, in an operator-unattended checkout system for processing articles selected for purchase and of first type bearing supplier-applied UPC indication and of second type not having supplier-applied UPC indication:

(a) reader means for generating output signals indicative of article UPC indication where present on articles;
(b) scale means for determining article weight and generating output signals indicative of determined article weight;
(c) display means for customer input; and
(d) processing means
  (1) operable without customer input for using said reader means output signals for determining first type article price and generating output signals indicative thereof; and
  (2) operable on said customer input to said display means for using said scale means output signals for generating output signals indicative of second type article price.

* * * * *